Figure 5:
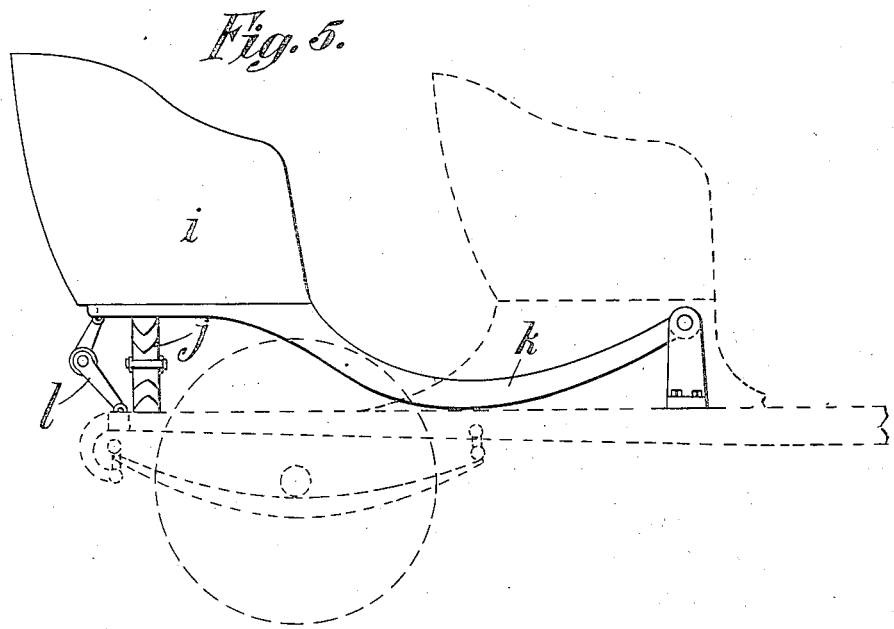
Figure 6:
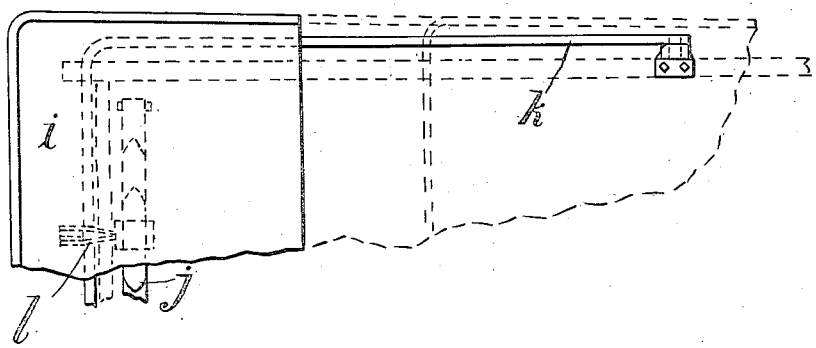
Figure 7:
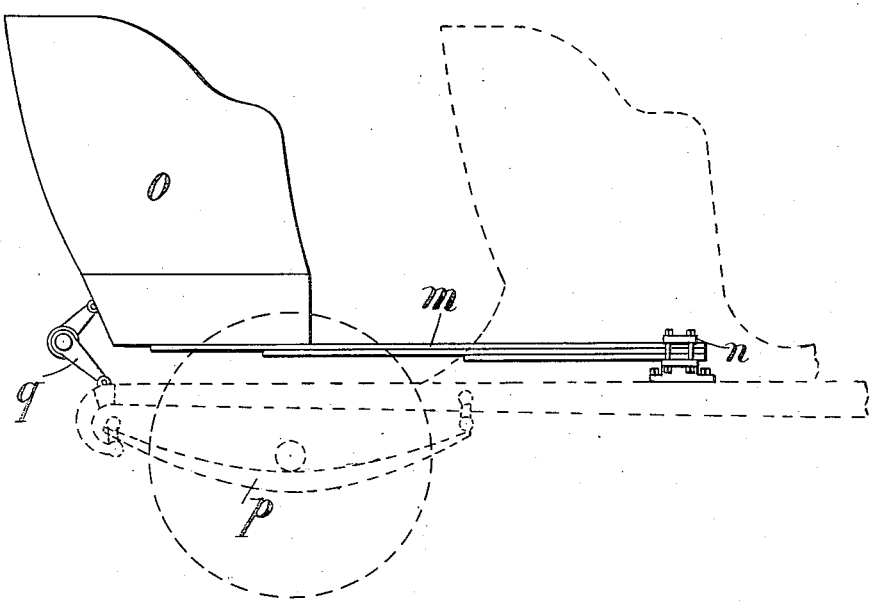
Figure 8:
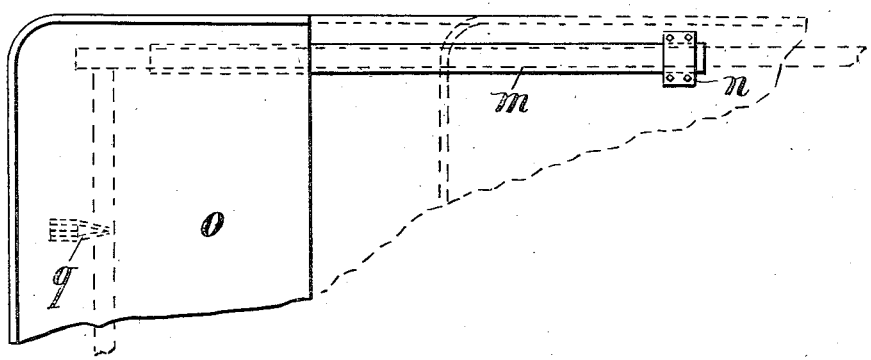

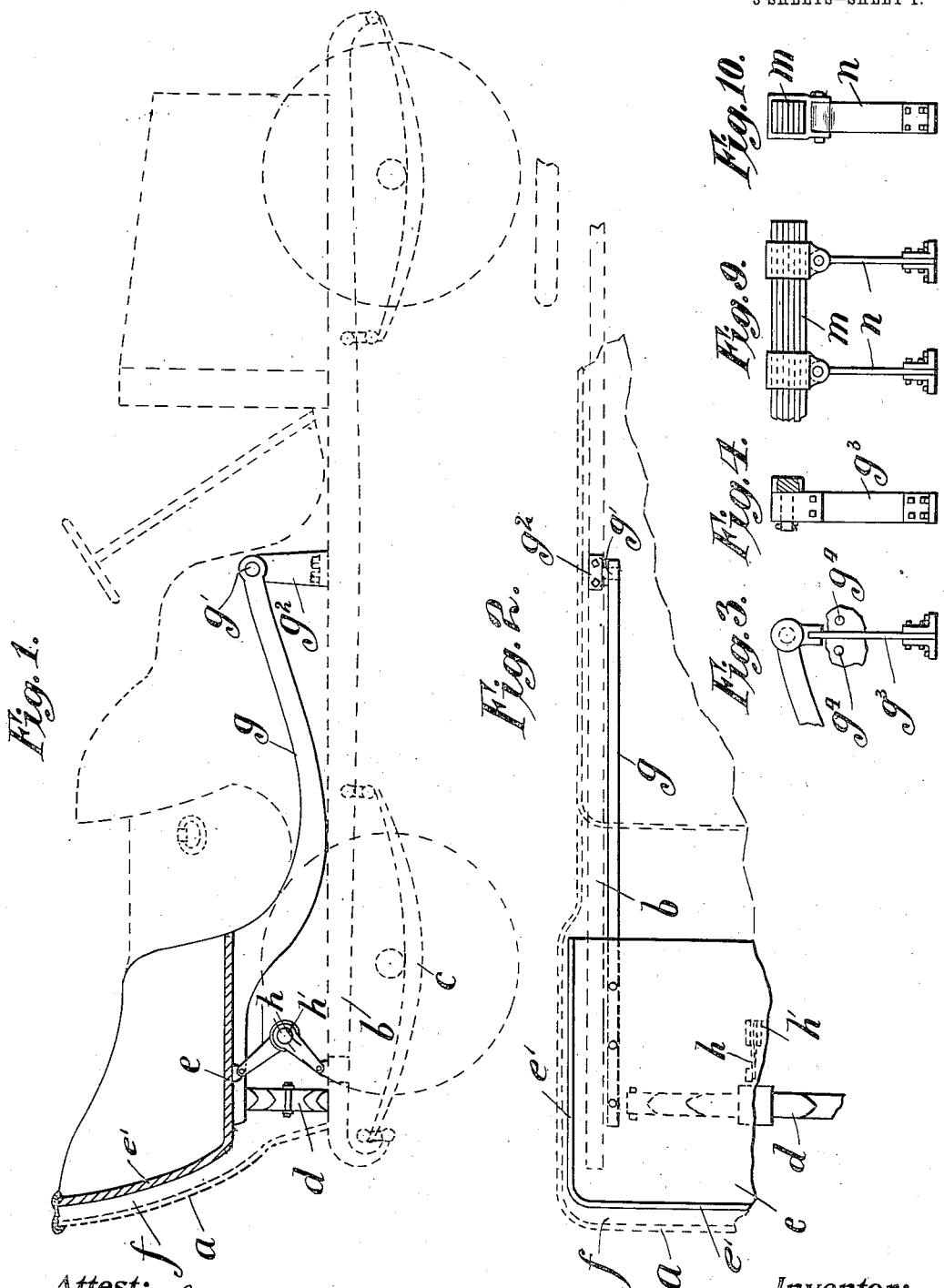

No. 817,682. PATENTED APR. 10, 1906.
O. WERNER.
SEAT SUSPENSION FOR MOTOR VEHICLES.
APPLICATION FILED SEPT. 16, 1905.

3 SHEETS—SHEET 3.

Attest:

Inventor:
Oscar Werner,
by F. W. Rucker, Atty.

UNITED STATES PATENT OFFICE.

OSCAR WERNER, OF NEW YORK, N. Y.

SEAT SUSPENSION FOR MOTOR-VEHICLES.

No. 817,682.  Specification of Letters Patent.  Patented April 10, 1906.

Application filed September 16, 1905. Serial No. 278,736.

*To all whom it may concern:*

Be it known that I, OSCAR WERNER, a citizen of the United States of America, and a resident of the borough of Manhattan, in the city, county, and State of New York, have invented certain new and useful Improvements in Seat Suspension for Motor-Vehicles, of which the following is a specification.

This invention relates to motor-vehicles, and it refers particularly to a novel means of suspension for the rear seats thereof, its purpose being to minimize the violence of the shocks communicated thereto from the rear axle when the vehicle is traversing rough or uneven roads.

As is well known to automobilists, the rear seat in motor-vehicles affords less comfortable riding than the front seat for the reason that while the front seat is usually disposed in a position intermediate the vertical planes of the front and rear axles, intersecting the diminishing vibrations arising from shocks communicated from the front and rear axles, the rear seat is usually disposed directly over the rear axle and springs, whereby the force of the jolts imparted to said rear axle communicates strong and disagreeable vibrations to the occupants of said rear seats.

The leaf-springs which support the vehicle at the rear must be strong enough to carry upon the rear axle the entire weight of the rear portion of the vehicle, as well as the passengers, and, further, must be sufficiently rigid to prevent undue sagging. Hence these suspension-springs may not be of a character light enough to adequately absorb the vibrations set up. In other words, the vehicle rear suspension-springs cannot adequately serve both functions of yieldingly suspending the car and of affording a resilient easy-riding motion for the occupants of the rear seat.

It is the purpose of my invention to remedy the defect referred to, and this I accomplish by providing an auxiliary lighter spring-support for the rear seat, which is independent of the car-body, connecting said seat positively with the car by a frame or forward extension which is held to the car at a point midway of the vertical planes of the forward and rear axles or midway of the center of gravity of the entire vehicle. In practice where the center of gravity of the vehicle and the wheel-base center are found to be in different vertical planes it may be desirable to connect the localizing member at a point midway between said centers, it being the object of my invention to place said connection in the position where it will be least subject to the influence of the shocks communicated through the axles and suspensory springs—namely, in that transverse vertical plane which includes the oscillatory axis of the vehicle.

The connecting member between the rear seat and the car may be of a rigid character horizontally pivoted or fulcrumed at said intermediate point or it may be tensional and in rigid engagement at said intermediate point. By such means the fixed engagement between the rear seat and the car is removed from a point directly over the rear axle, where it receives the maximum force of the shocks produced, to a point where the influence of said shocks is diminished to the minimum, and the effect of these lighter vibrations is largely nullified through absortion by the lighter or more resilient character of the auxiliary spring used to support the rear seat.

In order to minimize the force of the horizontal vibrations, such as are communicated by the engine, I may mount my localizing member upon a spring-support that is capable of yielding horizontally, and in this manner absorb to a large extent these horizontal vibrations.

My improvements further include the various details of construction and arrangements of parts, which will be described hereinafter and referred to in the accompanying drawings.

Figure I is an elevation of a motor-vehicle embodying my improvement. Fig. II is a partial plan view thereof. Figs. III and IV are detail views of a modified form of support for the localizing member. Fig. V is a partial side view of a motor-vehicle, showing a modified form of my improvement. Fig. VI is a partial plan of Fig. V. Fig. VII is a partial side view of a further modification. Fig. VIII is a partial plan of Fig. VII, and Figs. IX and X are detail views of the support for the localizing member shown in Figs. VII and VIII.

In Figs. I and II, I have illustrated my improvement in a vehicle which is provided with a rear seat that is independent of and auxiliary to the main car-body, whereby the general external appearance of the vehicle is not materially altered.

In said figures the letter *a* indicates a housing or main rear portion of the car-body and, as usual, is supported with the chassis $b$ upon leaf-springs, as $c$, which are carried by the rear axle. Mounted upon the chassis is a transversely-disposed leaf or other suitable spring, as $d$, that yieldingly supports the rear seat $e$, which may have a back and side extension, as $e'$, to afford a proper degree of comfort to the occupants. The spring $d$ is of such tensional quality that it will support the rear seat and its occupants with such degree of resiliency that it may absorb to the greatest possible extent the vibrations set up, and thus afford the easiest riding attainable.

In order to assist in the support of and to localize the rear seat, also to maintain the clearance $f$ between said seat and the part way surrounding wall $a$ of the main car-body, I provide a rigid carrier which may be in the form of a frame or yoke or comprise the parallel arms $g\ g$, extending forwardly of the rear seat to which they are connected, and said parallel arms at their forward ends being fulcrumed by horizontal studs $g'\ g'$ in bearings $g^2\ g^2$, carried by the chassis or the main body of the car. Said bearings $g^2\ g^2$, as seen in Figs. I and II, comprise uprights mounted upon and bolted to the chassis, providing a fulcrum located midway of the vertical planes of the wheel-axes; but said bearings may be provided in a transverse plane midway of the center of gravity or intermediate the centers of gravity and of the front and rear wheel-axes, the exact location of said bearings depending somewhat upon the particular construction of the vehicle with which used.

While the bearings $g^2\ g^2$ are shown in Fig. I as of a rigid structure, they may be flexible, as seen in Figs. III and IV, being composed of flat vertical springs $g^3$, adapted to yield longitudinally of the car, and this being capable of absorbing horizontal vibrations produced by the engine. Stops, as $g^4\ g^4$, of any suitable character may be disposed at each side of the springs $g^3$ to limit the degree of horizontal play allowed the latter.

A shock-limiting device may be interposed between the independent rear seat $e$ and the main body or chassis of the car to limit the movement of said seat relatively to the chassis. Said device may be in the form of a dash-pot or the like, or, as shown, it may comprise two angular arms $h\ h$, pivotally united at $h'$ and adapted, as is usual with these devices, to frictionally engage to a suitable degree. The outer ends of the arms $h\ h$ are pivotally connected, respectively, with the base of the independent seat $e$ and the main car-body or chassis.

The clearance $f$ between the back and sides $e'$ of the independent rear seat and the housing $a$ of the main body is sufficient to accommodate the independent seat and its back and sides in their movement. A loose covering of leather or the like, extends over the clearance $f$, being connected to the housing $a$ and the back and sides $e'$ to cover said clearance. Antifriction devices (not shown) may, if desired, be interposed between the sides $e'$ of the independent seat $e$ and the sides of housing $a$ to prevent jamming in the vertical ride of the independent seat.

While not limited thereto, I have shown the carrier-arms $g\ g$ as disposed respectively just within the sides of the car-body, where they are obscured from view. When used with a car having side entrances, said arms may be curved or dropped, as indicated, to lie below said entrances and the footboard.

In Figs V and VI, I show a simpler form of construction wherein the housing $a$ of Figs. I and II is dispensed with and the independent rear seat, as $i$, is supported above the chassis, over an intermediate clearance, by the spring $j$ and the carrier $k$. $l$ indicates a shock-limiting device interposed between the independent seat and the chassis. Instead of a rigid carrier or localizing member I may, as shown in Figs. VII, VIII, IX, and X, employ a carrier $m$ of leaf-spring construction that is rigidly connected at its forward ends to upright bearings, as $n$, which may or may not be of a spring-like character, adapted to yield horizontally within given bounds. Said carrier $m$ at its rear portion is secured to the rear seat $o$, which it supports in a horizontal plane above the chassis. The spring-carrier $m$ is more flexible than the main suspensory springs $p$ of the vehicle and is of a tension suitable for supporting the rear seat and its occupants while absorbing the vibrations received at its central junction with the car-body. A shock-limiting device, as $q$, may be employed with this form of my invention, as in the other forms thereof.

As will be evident from the foregoing, the essential features of my invention reside in the employment of means whereby the rear seat in a motor-vehicle is rendered free from any rigid connection with said vehicle in the vertical zone of the major jolts and shocks received thereby and whereby while said seat is carried by a relatively light spring-support it is horizontally localized through a fixed connection with the vehicle at an intermediate point thereof, where the influence of the jolts and shocks received is at the minimum.

Having now described my invention, I declare that what I claim is—

1. In a motor-vehicle, a chassis, suspension-springs supporting said chassis upon the front and rear axles, a rear seat, a relatively light auxiliary spring supporting said seat from the chassis, a frame for said seat, and a localizing connection between said frame and the chassis, said connection being disposed in a transverse plane centrally between the front and rear zones of major vertical shock vibrations.

2. In a motor-vehicle, a chassis, suspension-springs supporting said chassis upon the front and rear axles, a rear seat, a relatively light auxiliary spring supporting said seat from the chassis, a frame for said seat, a localizing connection between said frame and the chassis, said connection being disposed in a transverse plane centrally between the front and rear zones of major vertical shock vibrations, and a shock-limiting device interposed between the rear seat and chassis.

3. In a motor-vehicle, a chassis, suspension-springs supporting said chassis upon the front and rear axles, a rear seat, and resilient arms supporting said seat independently from the chassis, said resilient arms being mounted at their forward ends in a transverse plane centrally between the front and rear zones of major vertical shock vibrations.

4. In a motor-vehicle, a chassis, suspension-springs supporting said chassis upon the front and rear axles, a rear seat, resilient arms supporting said seat independently from the chassis, said resilient arms being mounted at their forward ends in a transverse plane centrally between the front and rear zones of major vertical shock vibrations, and a shock-limiting device interposed between the rear seat and chassis.

5. In a motor-vehicle, a chassis, suspension-springs supporting said chassis upon the front and rear axles, an independent rear seat, resilient means supporting said seat from the chassis, and a horizontally-resilient localizing connection between said seat and chassis, said connection being disposed in a transverse plane centrally between the front and rear zones of major vertical shock vibrations.

Signed at New York this 15th day of September, 1905.

OSCAR WERNER.

Witnesses:
    FREDERICK C. BONNY,
    F. W. BARKER.